United States Patent
Schloemer et al.

[11] Patent Number: 6,110,085
[45] Date of Patent: Aug. 29, 2000

[54] COATED ROLLER WITH PERMANENT IDENTIFICATION AND METHOD FOR PROVIDING SUCH IDENTIFICATION

[75] Inventors: Gert-Peter Schloemer, Leverkusen; Ralf Schwister, Bergheim, both of Germany

[73] Assignee: Felix Böttcher GmbH & Co., Köln, Germany

[21] Appl. No.: 09/058,150

[22] Filed: Apr. 10, 1998

[30] Foreign Application Priority Data

Apr. 11, 1997 [DE] Germany ............... 197 15 085

[51] Int. Cl.[7] ................................................. B25F 5/02
[52] U.S. Cl. ..................... 492/59; 209/3.3; 209/8; 209/568
[58] Field of Search ................ 209/3.3; 29/895.3, 29/895.32

[56] References Cited

U.S. PATENT DOCUMENTS

| | | | |
|---|---|---|---|
| 3,920,124 | 11/1975 | Patterson | 209/111.7 |
| 4,193,540 | 3/1980 | Dougadou | 235/454 |
| 4,778,060 | 10/1988 | Wessner, Jr. | 209/3.3 |
| 5,033,623 | 7/1991 | Grecksch et al. | 209/3.3 |
| 5,127,509 | 7/1992 | Kohlen et al. | 198/345.3 |
| 5,323,704 | 6/1994 | Fraczek | 101/375 |
| 5,624,708 | 4/1997 | Sedberry | 427/126.2 |
| 5,785,181 | 7/1998 | Quartarano, Jr. | 209/3.3 |

FOREIGN PATENT DOCUMENTS 1 0581056  2/1994  European Pat. Off. .

*Primary Examiner*—P. W. Echols
*Assistant Examiner*—Steven A Blount
*Attorney, Agent, or Firm*—Jacobson, Price, Holman & Stern, PLLC

[57] ABSTRACT

The coated roller with permanent identification is characterized in that an externally inducible microtransmitter with a multidigit alphanumerical code is attached at or in the roller core which microtransmitter is not nondestructively removable. Said microtransmitter is preferably resistant to temperatures of up to at least 180° C. and to chemicals.

19 Claims, 1 Drawing Sheet

COATED ROLLER WITH PERMANENT IDENTIFICATION AND METHOD FOR PROVIDING SUCH IDENTIFICATION

The present invention relates to a coated roller with permanent identification and to a method for providing coated rollers with a permanent identification and for the documentation of the life thereof.

Coated rollers generally consist of a roller core made of metal and a coating made of elastomers or plastic materials. As the coating generally has a limited life, it is removed from time to time, and a new coating is applied. Thus, a roller core can be coated several times in the course of its life.

Although it is possible to provide such coating with an identification, this does not permit to readily retrace the life of the roller core and thus to establish afterwards when and by whom new coatings have been applied. Moreover, in large printing offices, some rollers are coated with rubber cloths so that the coating is not even firmly connected with the roller core.

From EP-A-0 581 056, there is known a device for the identification of a roller coat which is made of a flexible material and employed in printing machines, the identification device consisting of a microchip and a scanning means, wherein the microchip is incorporated in the roller coat and the scanning means induces the microchip to emit signals, said signals allowing an unambiguous identification of the microchip and thus the roller coat.

It is technically difficult to incorporate a microchip in the roller coat, and even at a position where the coating is not used since otherwise the built-in microchip would lead to a change in elasticity and thus in the printing properties of the roller coating.

Further, this device for the identification of the roller coat only allows for its identification, but not for the documentation of the life of the roller core.

Thus, it has been the object of the invention to provide coated rollers with permanent identification and a method for providing coated rollers with a permanent identification and for the documentation of the life thereof.

This object is achieved by an externally inducible microtransmitter with a multidigit alphanumerical code being attached at or in the roller core which microtransmitter is not nondestructively removable. Said microtransmitter is to be resistant to temperatures of up to at least 180° C. and to chemicals, especially to those chemicals which get into contact with the coated rollers. In addition to printing inks, these are mainly organic solvents, such as alcohols and hydrocarbons, but also aqueous acids having an acid content of up to 10%.

Figure 1:
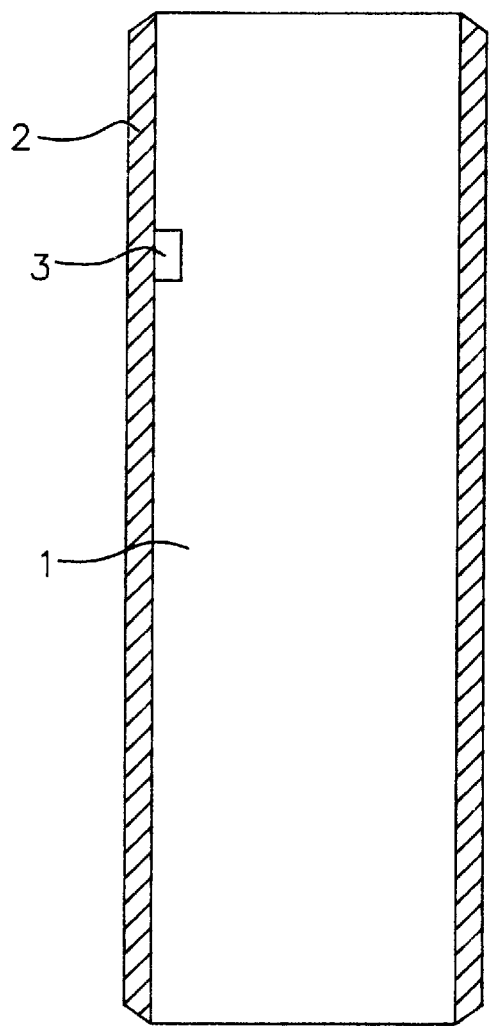
FIGS. 1 and 2 display cross-section views of the invention.
Figure 2:
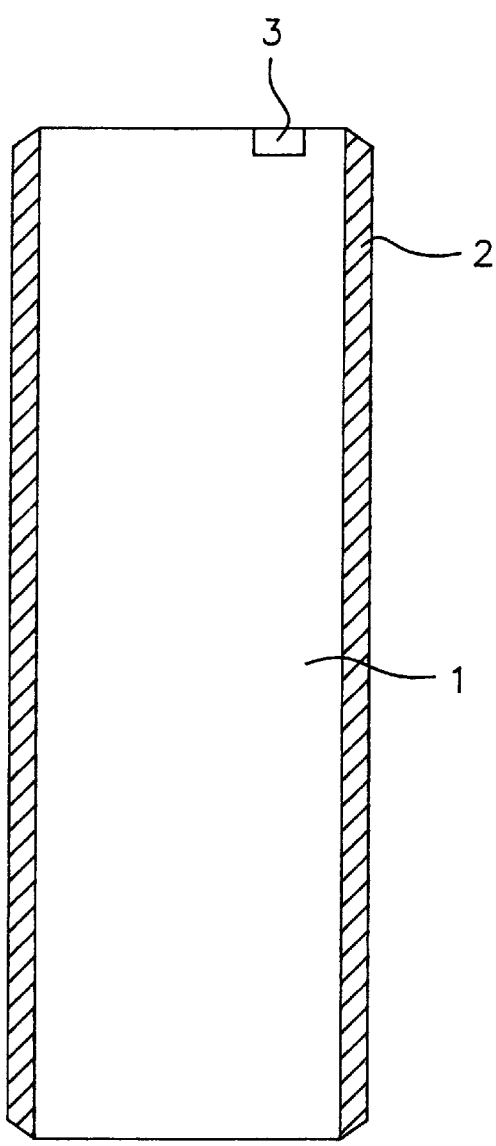

Therefore, the microtransmitters used according to the invention are preferably provided within a small glass tube. As exemplified in FIGS. 1 and 2, this glass tube is attached at or in the roller core by bonding it with a correspondingly reistant adhesive. This microtransmitter is preferably attached in the roller core by cutting a correspondingly large recess in the roller core in which the microtransmitter is incorporated. It may be advantageous to surround the microtransmitter already with an appropriate adhesive which may have the shape of a tablet, for example. For reasons of parallel with the glass tube.

As the adhesive, there may be used, in particular, two-component adhesives which are insensitive to temperatures of up to 180° C. and the above mentioned chemicals after curing. Also useful are one-component adhesives postcured by heating or vulcanization, or two-component adhesives in which one of the two reaction components is capped and therefore results in cross-linking with the other component only at elevated temperatures. For example, ABS is an established material with respect to temperature resistance and resistance to chemicals.

In order to ensure that the microtransmitter cannot be nondestructively removed or exchanged, it is recommendable to design the recess in the roller core at least partially with undercutting since, together with the adhesive, this results in a solid anchoring in the roller core. Since, after introducing the microtransmitter in the recess, the adhesive or plastic material can be converted to the same shape as the surrounding surface of the roller core, such a roller core can be coated with an elastomeric material 2, as exemplified in FIGS. 1 and 2, and vulcanized without any difficulty. Of course, roller cloths may also be mounted on such a roller core.

Since the microtransmitter can be induced in a non-contacting way and from some distance and reemits its multidigit alphanumerical code, it is easy to identify a roller with and without a coating nondestructively and quickly. The emitted information can then be correspondingly documented so that it can be precisely retraced when and wherewith the roller core has been newly coated and to whom the newly coated roller has been supplied. Thus, it is possible to establish and retrace the life of the coated roller, at least when it enters the plant for a new coating or leaves the plant again. In addition, it is also possible to quickly establish on the spot of use which roller it is and when it last left the plant.

Most microtransmitters are supplied with the quality feature of being temperature resistant up to 80° C. However, there are microtransmitters sealed in glass tubes which withstand 180° C. for several hours without difficulty so,that they withstand the application by vulcanization of a new coating to the roller core without difficulty.

In addition, the embedding in a plastic material and the bonding to the roller core ensure that later changes of or tampering with the alphanumeric code can be excluded.

Thus, it can be seen from all this that it is substantially more advantageous and simple No provide coated rollers with a permanent identification by connecting the roller core with an externally inducible microtransmitter than by merely incorporating a microchip in the roller coat.

What is claimed is:

1. A coated roller comprising
   a roller core made of metal,
   a coating on said roller core, and
   an externally inducible microtransmitter, which microtransmitter is attached at or below the surface of the roller core in such a way that the microtransmitter is not non-destructively removable, and which microtransmitter emits, when induced, a multidigit alphanumerical code of identification.

2. The roller according to claim 1, characterized in that said microtransmitter is resistant to temperatures of up to at least 180° C. and to chemicals.

3. The roller according to claim 1, characterized in that said microtransmitter is attached by incorporating the microtransmitter into a recess in the roller core.

4. The roller according to claim 3, characterized in that said recess is undercut.

5. The roller according to claim 1, characterized in that said microtransmitter is attached by an adhesive insensitive to temperatures up to 180° C. and to chemicals.

6. The roller according to claim 5, characterized in that said microtransmitter is attached by anchoring in a recess in the roller core.

7. The roller according to claim 6, characterized in that said recess is undercut.

8. The roller according to claim 1, characterized in that said microtransmitter is provided in a glass tube, which glass tube is attached to the roller core.

9. The roller according to claim 8, characterized in that said glass tube is bonded to the roller core by an adhesive insensitive to temperatures up to 180° C. and to chemicals.

10. The roller according to claim 9, characterized in that said glass tube is anchored in a recess in the roller core.

11. The roller according to claim 10, characterized in that said recess is undercut.

12. In a method of making a coated roller involving applying a coating to a roller core made of metal, the improvement comprising attaching an externally inducible microtransmitter at or below the surface of the core in such a way that the microtransmitter is not nondestructively removable, which microtransmitter emits, when induced, a multi-digit alphanumerical code of identification.

13. The method according to claim 12, characterized in that said microtransmitter is resistant to temperatures of up to at least 180° C. and to chemicals.

14. The method according to claim 12, characterized in that a recess is cut into the roller core and said microtransmitter is incorporated into said recess.

15. The method according to claim 14, characterized in that said recess is at least partly undercut.

16. The method according to claim 12, characterized in that said microtransmitter is provided in a glass tube, which glass tube is attached to the roller core.

17. A roller core useful in making a coated roller, said roller core comprising a core made of metal and an externally inducible microtransmitter, which microtransmitter is attached at or below the surface of the core in such a way that the microtransmitter is not non-destructively removable, and which microtransmitter emits, when induced, a multidigit alphanumerical code of identification.

18. The roller core according to claim 17, characterized in that said microtransmitter is resistant to temperatures of up to at least 180° C. and to chemicals.

19. The roller according to claim 1, wherein the coating is an elastomer material, a plastic material, or a rubber cloth.

* * * * *

UNITED STATES PATENT AND TRADEMARK OFFICE
CERTIFICATE OF CORRECTION

PATENT NO. : 6,110,085
DATED : August 29, 2000
INVENTOR(S) : Gert-Peter Schlöemer et al.

It is certified that error appears in the above-identified patent and that said Letters Patent is hereby corrected as shown below:

Column 2,
Line 43, change "No provide" to -- to provide --.

Signed and Sealed this

Fourth Day of September, 2001

*Attest:*

*Nicholas P. Godici*

*Attesting Officer*

NICHOLAS P. GODICI
*Acting Director of the United States Patent and Trademark Office*